(12) United States Patent
Minato et al.

(10) Patent No.: US 10,434,464 B2
(45) Date of Patent: Oct. 8, 2019

(54) COMPRESSED-AIR DRYING DEVICE, METHOD FOR CONTROLLING COMPRESSED-AIR DRYING DEVICE, AND VEHICLE

(71) Applicant: NABTESCO AUTOMOTIVE CORPORATION, Tokyo (JP)

(72) Inventors: Ichiro Minato, Tokyo (JP); Hiroki Hasebe, Tokyo (JP); Kazuya Yoketa, Tokyo (JP); Masanori Momoki, Tokyo (JP)

(73) Assignee: NABTESCO AUTOMOTIVE CORPORATION, Tokyo (JP)

( * ) Notice: Subject to any disclaimer, the term of this patent is extended or adjusted under 35 U.S.C. 154(b) by 286 days.

(21) Appl. No.: 15/330,791

(22) PCT Filed: May 8, 2015

(86) PCT No.: PCT/JP2015/063292
§ 371 (c)(1),
(2) Date: Nov. 7, 2016

(87) PCT Pub. No.: WO2015/170737
PCT Pub. Date: Nov. 12, 2015

(65) Prior Publication Data
US 2017/0165605 A1    Jun. 15, 2017

(30) Foreign Application Priority Data
May 9, 2014    (JP) .................................. 2014-097422

(51) Int. Cl.
*B01D 53/02*        (2006.01)
*B01D 53/26*        (2006.01)
(Continued)

(52) U.S. Cl.
CPC ......... *B01D 53/26* (2013.01); *B01D 53/0454* (2013.01); *B01D 53/261* (2013.01);
(Continued)

(58) Field of Classification Search
CPC ............ B01D 2257/80; B01D 2258/06; B01D 2259/4566; B01D 53/0438;
(Continued)

(56) References Cited

U.S. PATENT DOCUMENTS

| | | | | |
|---|---|---|---|---|
| 4,685,941 | A | * | 8/1987 | Sato ...................... B01D 53/261 96/114 |
| 2010/0074764 | A1 | * | 3/2010 | Schnittger ............. B60T 17/004 417/53 |

(Continued)

FOREIGN PATENT DOCUMENTS

| | | |
|---|---|---|
| JP | S58-067319 A | 4/1983 |
| JP | H04-103456 A | 4/1992 |

(Continued)

OTHER PUBLICATIONS

Translation of JP H04-103456 A; 1992, Souchi.*
(Continued)

*Primary Examiner* — Christopher P Jones
(74) *Attorney, Agent, or Firm* — Pillsbury Winthrop Shaw Pittman, LLP

(57) ABSTRACT

A compressed air drying device that dries compressed air discharged from a compressor includes a dryer and a controller. The dryer includes a drying container, which is filled with a desiccant, and a discharge valve arranged in a discharge port that discharges drainage produced by regeneration of the desiccant. The controller obtains an ambient temperature and controls opening and closing of the discharge valve. When the ambient temperature is a temperature at which freezing occurs, the controller moves the
(Continued)

compressed air, which is discharged from the compressor and heated, into the dryer and restricts opening of the discharge valve.

10 Claims, 4 Drawing Sheets

(51) Int. Cl.
*B60T 17/00* (2006.01)
*B01D 53/04* (2006.01)

(52) U.S. Cl.
CPC ........ *B60T 17/004* (2013.01); *B01D 53/0438* (2013.01); *B01D 2257/80* (2013.01); *B01D 2258/06* (2013.01); *B01D 2259/4566* (2013.01); *B60G 2600/66* (2013.01)

(58) Field of Classification Search
CPC .. B01D 53/0454; B01D 53/26; B01D 53/261; B60G 2600/66; B60T 17/004
See application file for complete search history.

(56) References Cited

U.S. PATENT DOCUMENTS

| | | | |
|---|---|---|---|
| 2012/0153711 | A1 | 6/2012 | Minato et al. |
| 2014/0144326 | A1 | 5/2014 | Minato et al. |
| 2015/0360668 | A1* | 12/2015 | Wright .................. B60T 17/004 137/2 |

FOREIGN PATENT DOCUMENTS

| | | |
|---|---|---|
| JP | H09-029055 A | 2/1997 |
| JP | H09-122434 A | 5/1997 |
| JP | 2010-221179 A | 10/2010 |
| JP | 2012-140107 A | 7/2012 |

OTHER PUBLICATIONS

International Preliminary Report on Patentability and the Written Opinion of the International Searching Authority as issued in International Patent Application No. PCT/JP2015/063292, dated Nov. 15, 2016.

International Search Report as issued in International Patent Application No. PCT/JP2015/063292, dated Jul. 21, 2015.

* cited by examiner

US 10,434,464 B2

COMPRESSED-AIR DRYING DEVICE, METHOD FOR CONTROLLING COMPRESSED-AIR DRYING DEVICE, AND VEHICLE

CROSS-REFERENCE TO RELATED APPLICATIONS

This application is the U.S. National Stage of PCT/JP2015/063292, filed May 8, 2015, which in turn claims priority to Japanese Patent Application No. JP2014-097422, filed May 9, 2014. The contents of these applications are incorporated herein by reference in their entireties.

TECHNICAL FIELD

The present invention relates to a compressed air drying device that supplies dry compressed air, which is obtained by drying compressed air sent from a compressor, a method for controlling a compressed air drying device, and a vehicle including a compressed air drying device.

BACKGROUND ART

A compressed air supply system known in the art supplies dry compressed air to a load of a vehicle such as an air brake system or an air suspension. The compressed air supply system includes a compressor and a compressed air drying device. The compressed air drying device, which is arranged between the compressor and the vehicle load, dries compressed air. Nowadays, electronic control units (ECUs) are used to control compressed air drying devices (refer to, for example, patent document 1).

A compressed air drying device is provided with an air dryer, which includes a desiccant, and is referred to as an air dryer module. The compressed air drying device performs a loading operation and an unloading operation. In the loading operation, compressed air passes through the desiccant so that dry compressed air flows to the vehicle load. In the unloading operation, the flow of compressed air is reversed so that the compressed air flows to the air dryer to regenerate the desiccant of the air dryer. The air dryer module includes a discharge valve (exhaust valve) to discharge drainage. During regeneration, drainage collects in the discharge valve.

Under a cold condition in which the ambient temperature is below the freezing temperature, the drainage and water collected on the discharge valve may freeze. When forcibly opening the frozen discharge valve, excessive force may be applied to the discharge valve and cause an abnormality. Thus, the compressed air drying device of the prior art is provided with a heater to raise the temperature of the discharge valve.

PRIOR ART DOCUMENT

Patent Document

Patent Document 1: Japanese Laid-Open Patent Publication No. 2012-140107

SUMMARY OF THE INVENTION

Problem that is to be Solved by the Invention

However, when raising the temperature of the discharge valve with a heater as described above, a large amount of electricity is consumed before the discharge valve unfreezes.

Accordingly, it is an object of the present invention to provide a compressed air drying device, a method for controlling the compressed air drying device, and a vehicle that consume less power when unfreezing a discharge valve that discharges drainage.

Means for Solving the Problem

To solve the above problem, one aspect of the present invention provides a compressed air drying device that dries compressed air discharged from a compressor. The compressed air drying device includes a dryer and a controller. The dryer including a drying container and a discharge valve. The drying container is filled with a desiccant. The discharge valve is arranged in a discharge port that discharges drainage produced by regeneration of the desiccant. The compressed air, which is compressed and heated by the compressor, moves into the dryer. The controller obtains an ambient temperature and controls opening and closing of the discharge valve. When the ambient temperature is a temperature at which freezing occurs, the controller moves the compressed air, which is discharged from the compressor and heated, into the dryer and restricts opening of the discharge valve.

To solve the above problem, a further aspect of the present invention provides a method for controlling a compressed air drying device. The compressed air drying device includes a dryer and a controller. The dryer includes a drying container and a discharge valve. The drying container is filled with a desiccant that dries compressed air discharged from a compressor and heated. The discharge valve is arranged in a discharge port that discharges drainage produced by regeneration of the desiccant. The controller obtains an ambient temperature and controls opening and closing of the discharge valve. The method includes moving the compressed air, which is discharged from the compressor and heated, into the dryer and restricting opening of the discharge valve with the controller when the ambient temperature is a temperature at which freezing occurs.

To solve the above problem, another aspect of the present invention provides a vehicle including a compressed air drying device that dries compressed air discharged from a compressor. The compressed air drying device includes a dryer and a controller. The dryer includes a drying container and a discharge valve. The drying container is filled with a desiccant. The discharge valve is arranged in a discharge port that discharges drainage produced by regeneration of the desiccant. The compressed air, which is compressed and heated by the compressor, moves into the dryer. The controller obtains an ambient temperature and controls opening and closing of the discharge valve. When the ambient temperature is a temperature at which freezing occurs, the controller moves the compressed air, which is discharged from the compressor and heated, into the dryer and restricts opening of the discharge valve.

In the compressed air drying device, the method, and the vehicle, when there is a possibility of the discharge valve freezing, the opening of the discharge valve is restricted. This obviates the occurrence of an abnormality in the discharge valve. Further, during the period in which opening of the discharge valve is restricted, the dryer is supplied with heated compressed air. This unfreezes the discharge valve without using a heater. Accordingly, the amount of power consumption is reduced when starting the engine.

Preferably, in the compressed air drying device, the controller measures an elapsed time from when operation of the compressor starts, and the controller permits opening of the discharge valve when the elapsed time exceeds a wait time that is set in advance.

In this configuration, the dryer is supplied with heated compressed air during the period in which the elapsed time is shorter than or equal to the wait time. This unfreezes the discharge valve.

Preferably, the compressed air drying device includes a pressure sensor that detects a downstream pressure, which is the pressure at a downstream side of the desiccant, and the controller stops operation of the compressor when the downstream pressure is higher than or equal to an upper limit value while restricting opening of the discharge valve.

In this configuration, the compressor stops when the downstream pressure is higher than or equal to the upper limit value. Thus, even when unfreezing the discharge valve, the supply of excessive air to the downstream side of the compressed air drying device is prevented.

Preferably, the compressed air drying device includes an anti-freezing device that prevents freezing of the discharge valve, and the controller deactivates the anti-freezing device when determining that the discharge valve is not frozen.

In this configuration, the anti-freezing device is deactivated when the discharge valve is not frozen. This reduces the power consumed by the anti-freezing device.

A further aspect of the present invention provides a compressed air drying device that dries compressed air discharged from a compressor with a desiccant. The compressed air drying device includes a discharge valve that discharges drainage produced by regeneration of the desiccant and a controller that controls opening and closing of the discharge valve. When an ambient temperature is lower than or equal to a predetermined temperature, the controller restricts opening of the discharge valve and supplies the compressed air discharged from the compressor to around the discharge valve.

A further aspect of the present invention provides a vehicle including the compressed air drying device.

A further aspect of the present invention provides a method for drying compressed air discharged from a compressor with a compressed air drying device that includes a desiccant. The compressed air drying device includes a discharge valve that discharges drainage produced by regeneration of the desiccant. The method includes when an ambient temperature is lower than or equal to a predetermined temperature, restricting opening of the discharge valve and supplying the compressed air discharged from the compressor to around the discharge valve.

Effect of the Invention

The present invention succeeds in providing a compressed air drying device, a method for controlling the compressed air drying device, and a vehicle that consume less power when unfreezing a discharge valve that discharges drainage.

Other aspects and advantages of the present invention will become apparent from the following description, taken in conjunction with the accompanying drawings, illustrating by way of example the principles of the invention.

MODES FOR CARRYING OUT THE INVENTION

First Embodiment

A compressed air drying device of a first embodiment will now be described. The compressed air drying device is installed in a vehicle that uses an engine as a drive source.

Figure 1:
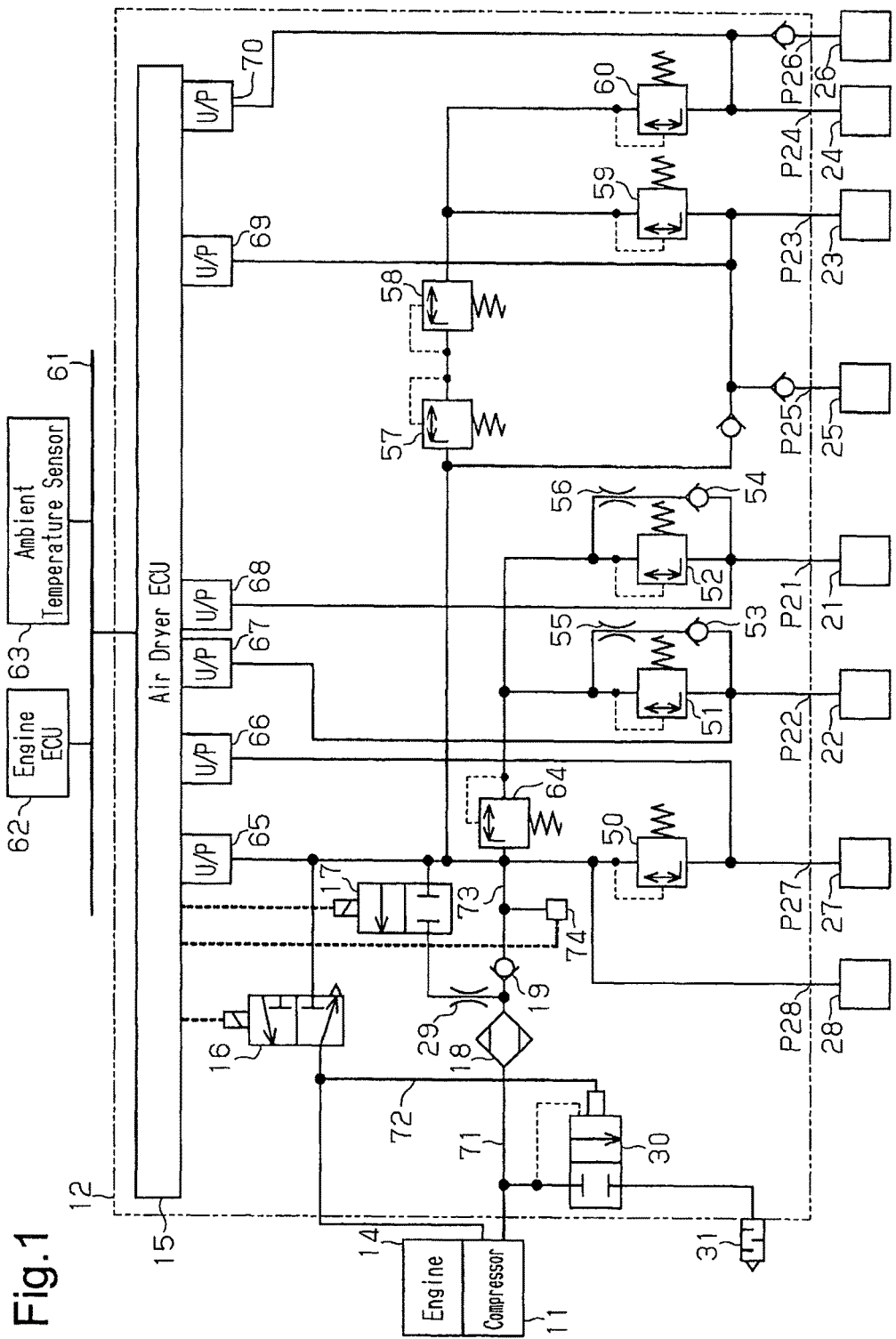
FIG. 1 is a schematic block diagram showing a compressed air drying device according to a first embodiment of the present invention.

As shown in FIG. 1, a compressed air drying device 12 and a compressor 11 configures a compressed air supplying system. Power can be transmitted from an engine 14 to the compressor 11 by a transmission mechanism (not shown). The compressed air drying device 12 includes an air dryer ECU 15 that serves as a controller.

The compressor 11 is controlled by the air dryer ECU 15 and switched between a loading state in which air is compressed and an unloading state in which air is not compressed.

The downstream side of the compressed air drying device 12 is connected to first to eighth loads 21 to 28 that are installed in the vehicle. The first load 21 is a front wheel brake. The second load 22 is a rear wheel brake. The third load 23 is a pneumatic pressure system for a trailer. The fourth load 24 and the sixth load 26 are accessories such as a horn. The fifth load 25 is a parking brake. The seventh load 27 is an air suspension system. The eighth load 28 is a system that supplies compressed air to the tires.

The compressed air drying device 12 will now be described. The compressed air drying device 12 includes a first electromagnetic valve 16, a second electromagnetic valve 17, a drying container 18, and a discharge valve 30. The discharge valve 30 is operated in accordance with the output state of a pneumatic pressure signal from the first electromagnetic valve 16. The air dryer ECU 15 includes, for example, a CPU, a RAM, and a ROM. Further, the air dryer ECU 15 controls the first electromagnetic valve 16 and the second electromagnetic valve 17 in accordance with programs stored in the ROM and the others. The drying container 18, which includes a desiccant, removes moisture from the compressed air that is supplied by the compressor 11 and enters the drying container 18 through a compressed air supply passage 71. The dry compressed air generated in this manner is supplied to the loads 21 to 28 via a check valve 19 and a dry compressed air supply passage 73. The drying container 18 also includes an oil mist collector (not shown) that collects oil mist from the compressed air.

The first electromagnetic valve 16 is a normally-closed three-port valve. When activated, the first electromagnetic valve 16 sends a pneumatic pressure signal to the discharge valve 30 and the compressor 11 via a signal line 72. The discharge valve 30, which is normally closed, opens in accordance with the pneumatic pressure signal output from the first electromagnetic valve 16. When the interior pressure of the discharge valve 30 is high and exceeds an upper limit value, the discharge valve 30 is forcibly opened. The discharge valve 30 is connected to a discharge port 31 that includes a silencer. The discharge port 31 is open to the atmosphere.

The compressor 11 shifts to the unloading state described above when receiving the pneumatic pressure signal from the first electromagnetic valve 16. When the compressor 11 is in the unloading state and the discharge valve 30 opens, the compressed air in the compressed air drying device 12 flows toward the discharge valve 30. The reversed flow of compressed air in the drying container 18 removes moisture from the desiccant. The water, which is removed from the desiccant, and the compressed air are discharged toward the downstream side of the drying container 18. The water and impurities, such as oil, discharged from the drying container 18 in this manner are discharged as drainage from the discharge port 31.

The second electromagnetic valve 17 is a normally-closed two port valve and controlled by the air dryer ECU 15. When activated, the second electromagnetic valve 17 opens and causes the dry compressed air in the compressed air drying device 12 or an external tank to flow in a reverse direction.

Figure 2:
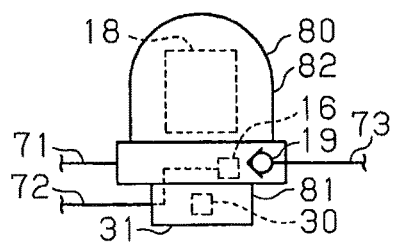
FIG. 2 is a schematic diagram of a dryer that configures the compressed air drying device of the embodiment.

As shown in FIG. 2, in the present embodiment, the first electromagnetic valve 16, the second electromagnetic valve 17, the drying container 18, and the discharge valve 30 form a dryer 80. The first electromagnetic valve 16, the discharge valve 30 and its downstream discharge port 31., and the check valve 19 are arranged in a housing 81. The second electromagnetic valve 17 is also arranged in the housing 81 (not shown). The drying container 18 is arranged in a cover 82 that is supported by the housing 81.

Further, the compressed air drying device 12 includes ports P21 to P28 that supply the loads 21 to 28 with dry compressed air.

As shown in FIG. 1, the first port P21 is connected to the first load 21. The second port P22 is connected to the second load 22. A pressure reducing valve 64 and protection valves 51 and 52 are provided in a supply passage that connects the check valve 19 to the first load 21 and in a supply passage that connects the check valve 19 to the second load 22. A check valve 53 and a throttle 55 are connected in parallel to the protection valve 51. A check valve 54 and a throttle 56 are connected in parallel to the protection valve 52. The protection valve 51 closes when the compressed air circuit of the first load 21 fails. The protection valve 52 closes when the compressed air circuit of the second load 22 fails.

The third port P23 is connected to the third load 23. A pressure reducing valve 57 and protection valves 58 and 59 are provided in a supply passage that connects the downstream side of the check valve 19 to the third port P23. The protection valves 58 and 59 close when the compressed air circuit of the third load 23 fails.

The fourth port P24 is connected to the fourth load 24. The sixth port P26 is connected to the sixth load 26. The pressure reducing valve 57 and protection valves 58 and 60 are provided in a supply passage that connects the downstream side of the check valve 19 to the fourth port P24 and the sixth port P26. The protection valves 58 and 60 close when the compressed air circuit of the fourth load 24 and the compressed air circuit of the sixth load 26 fail. The fifth port P25 is connected to the fifth load 25.

The seventh port P27 is connected to the seventh load 27. A protection valve 50 is arranged in a supply passage that connects the check valve 19 to the seventh port P27. The protection valve 50 closes when the compressed air circuit of the seventh load 27 fails. The eighth port P28 is connected to the eighth load 28.

The air dryer ECU 15 is connected via an on-board network 61, such as a CAN, to an ambient temperature sensor 63, which is arranged on the vehicle body, and to an engine ECU 62. The air dryer ECU 15 obtains the ambient temperature Tmp through the on-board network 61 and the state of the engine 14 from the engine ECU 62.

The compressed air drying device 12 further includes pressure sensors 65 to 70. The pressure sensor 65 detects pressure Phc, which is the downstream pressure of the drying container 18 and which is the high-pressure side pressure of the compressed air drying device 12, and outputs the detected pressure Phc to the air dryer ECU 15. The dry compressed air supply passage 73 includes a humidity sensor 74. The humidity sensor 74 detects the humidity at the downstream side of the drying container 18 and outputs the detected humidity to the air dryer ECU 15.

The air dryer ECU 15 regenerates the desiccant with which the drying container 18 is filled when, for example, the humidity measured by the humidity sensor 74 exceeds a predetermined humidity. Subsequent to regeneration, the deterioration level and the replacement time of the desiccant in the drying container 18 may be determined based on the humidity measured by the humidity sensor 74.

The pressure sensor 66 detects the pressure of a supply passage connected to the seventh port P27, and the pressure sensor 67 detects the pressure of a supply passage connected to the second port P22. The pressure sensor 68 detects the pressure of a supply passage connected to the first port P21. The pressure sensor 69 detects the pressure of a supply passage connected to the fifth port P25 and the third port P23. The pressure sensor 70 detects the pressure of a supply passage connected to the fourth port P24 and the sixth port P26. Each of the pressure sensors 66 to 70 outputs the detected pressure to the air dryer ECU 15.

Under the control of the air dryer ECU 15, the compressed air drying device 12 performs a loading operation and an unloading operation. In the loading operation, the compressed air supplied from the compressor 11 is passed through the drying container 18 and discharged as dry compressed air. In the unloading operation, the drying container 18 is regenerated and drainage that includes water is discharged from the discharge port 31.

In the loading operation, the air dryer ECU 15 does not activate the first electromagnetic valve 16 and the second electromagnetic valve 17. Further, the air dryer ECU 15 sets the compressor 11 to the loading state so that compressed air is supplied. The compressed air entering the compressed air drying device 12 passes through the drying container 18 and is supplied via the ports P21 to P28 to the loads 21 to 28.

When dry compressed air stored in air tanks (not shown) of at least some of the loads 21 to 28 causes the pressure Phc at the downstream side of the drying container 18 to become greater than or equal to an upper limit value, the air dryer ECU 15 activates the first electromagnetic valve 16 and the second electromagnetic valve 17. When activated, the first electromagnetic valve 16 outputs a pneumatic pressure signal and starts the unloading operation. In the unloading operation, the compressor 11 is set to the unloading state, the second electromagnetic valve 17 and the discharge valve 30 open, and drainage is discharged from the discharge port 31. When the pressure Phc at the downstream side of the drying container 18 becomes lower than a lower limit value, the air dryer ECU 15 deactivates the first electromagnetic valve 16, closes the discharge valve 30, and sets the compressor 11 to the loading state.

(Operation)

The operation of the compressed air supply system when the engine is started will now be described with reference to FIG. 3. The air dryer ECU 15 starts the operation under the condition that the ignition switch is on. The on state and off state of the ignition switch are obtained via the on-board network 61 from the engine ECU 62.

Figure 3:
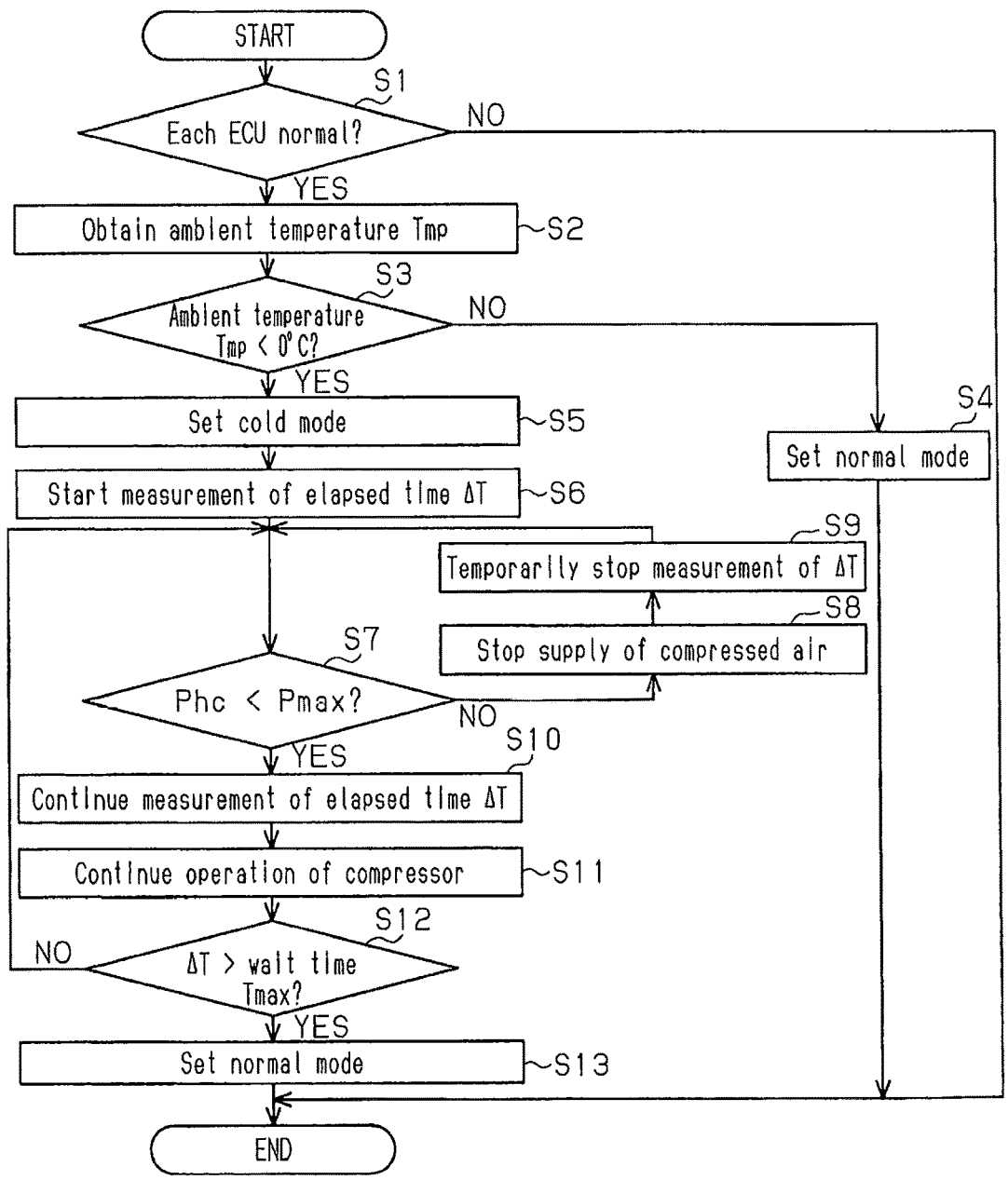
FIG. 3 is a flowchart illustrating the operation of the compressed air drying device of the embodiment when the engine is started.

Referring to FIG. 3, the air dryer ECU 15 determines whether the ECUs, such as the air dryer ECU 15 and the engine ECU 62, are normal (step S1). When determining that the ECUs are normal (step S1: YES), the air dryer ECU 15 proceeds to step S2. When any one of the ECUs is determined as being abnormal (step S1: NO), the air dryer ECU 15 ends the process.

In step S2, the air dryer ECU 15 obtains the ambient temperature Tmp through the on-board network 61 and determines whether or not the ambient temperature Tmp is lower than 0°, which is the temperature at which the discharge valve 30 freezes (step S3). The temperature at which the discharge valve 30 freezes is the temperature at which freezing potentially occurs regardless of whether or not water on the discharge valve 30 actually freezes.

When the ambient temperature Tmp is 0° or higher (step S3: NO), the air dryer ECU 15 sets a normal mode (step S4). In the normal mode, the air dryer ECU 15 performs the loading operation and the unloading operation in accordance with the pressure Phc at the lower side of the drying container 18 as described above. More specifically, in the normal mode, opening of the discharge valve 30 is permitted.

When the ambient temperature Tmp is lower than 0° C. (step S3: YES), the air dryer ECU 15 sets a cold mode (step S5) and performs processing in the cold mode. In the cold mode, the air dryer ECU 15 sets the compressor 11 to the loading state, supplies compressed air from the compressor 11, and prohibits activation of the first electromagnetic valve 16 and the second electromagnetic valve 17. The compressed air supplied from the compressor 11 is increased in temperature by at least the heat generated when air is compressed. When the compressor 11 is located at a position where heat is transmitted from the engine 14, the compressed air is also increased in temperature by the heat generated when the engine 14 is driven. Depending on the structure of the vehicle, the temperature of the compressed air entering the compressed air drying device 12 is increased to approximately 60° C. Thus, even when the discharge valve 30 is frozen, the passage of the compressed air through the dryer 80, which includes the drying container 18 and the discharge valve 30, unfreezes the discharge valve 30 within a few minutes. When setting the cold mode, the air dryer ECU 15 starts measuring the elapsed time $\Delta T$ from when the engine 14 is started (step S6).

While the cold mode is being processed, the air dryer ECU 15 receives the pressure Phc from the pressure sensor 65 and determines whether or not the pressure Phc is lower than or equal to an upper limit value Pmax (step S7). In the present embodiment, the upper limit value Pmax is set at the same value as the pressure that starts the unloading operation.

When determining that the pressure Phc is lower than the upper limit value Pmax (step S7: YES), the air dryer ECU 15 operates the compressor 11 while continuing the cold mode (step S10). When the pressure Phc is higher than or equal to the upper limit value Pmax (step S7: NO), the air dryer ECU 15 sets the compressor 11 to the unloading state to stop the supply of compressed air (step S8). Further, the air dryer ECU 15 temporarily stops measuring the elapsed time $\Delta T$ (step S9) and then returns to step S7. When the brake pedal is depressed or the air suspension is driven, and the dry compressed air in the air tanks is consumed, and the pressure Phc becomes lower than the upper limit value Pmax.

When determining that the pressure Phc is lower than the upper limit value Pmax (step S7: YES), the air dryer ECU 15 continues to measure the elapsed time $\Delta T$ (step S10) and continues to drive the compressor 11 (step S11). When the measurement of the elapsed time $\Delta T$ has been temporarily stopped in step S9, time is measured from the elapsed timed $\Delta T$ obtained when the measurement was temporarily stopped.

Then, the air dryer ECU 15 determines whether or not the elapsed time $\Delta T$ has exceeded a wait time Tmax (step S12). The wait time Tmax is the time required to unfreeze the discharge valve 30 from when the compressor 11 is driven and compressed air enters the compressed air drying device 12. The wait time Tmax is obtained through experiments or the like and set to, for example, a few minutes. When the elapsed time $\Delta T$ is shorter than or equal to the wait time Tmax (step S12: NO), the air dryer ECU 15 returns to step S7 and repeats the above steps.

When determining that the elapsed time $\Delta T$ is the wait time Tmax or longer (step S12: YES), the air dryer ECU 15 shifts to the normal mode (step S13) and permits opening of the discharge valve 30.

In this manner, when the engine 14 is started under a cold condition in which freezing of the discharge valve 30 can be expected, the compressed air having an increased temperature is supplied during the wait time Tmax while opening of the discharge valve 30 remains prohibited. Thus, there is no need for a heater. Further, the dry compressed air can be supplied to each of the loads 21 to 28. Moreover, the discharge valve 30 and the drying container 18 are arranged in the same dryer 80. Thus, when the heated compressed air enters the dryer 80, the discharge valve 30 can be unfrozen within a short period of a few minutes. If a heater were to be used to increase the temperature of the compressed air drying device 12, power will be consumed to drive the heater. Further, a long period of, for example, tens of minutes will be required until the discharge valve 30 unfreezes. Accordingly, the amount of power consumed to unfreeze the discharge valve 30 is much smaller than that when using a heater.

Supplying heated compressed air for a fixed period obtains an unfreezing effect and a freezing prevention effect for devices other than the discharge valve 30. Examples of devices that can be unfrozen or devices in which freezing can be prevented include, for example, valves for setting the compressor 11 to the unloading state, various types of valves arranged between the compressor 11 and the drying container 18, and valves of the oil mist separator (not shown) that captures oil mist.

The present embodiment has the advantages described below.

(1) When there is a possibility of the discharge valve 30 freezing, the opening of the discharge valve 30 is restricted. This obviates the occurrence of an abnormality in the discharge valve 30. Further, during the period in which opening of the discharge valve 30 is restricted, the compressed air drying device 12 is supplied with compressed air that is heated by the engine 14. This unfreezes the discharge valve 30 without using a heater. Accordingly, the amount of power consumption is reduced when starting the engine.

(2) The air dryer ECU 15 supplies the compressed air drying device 12 with heated compressed air during the period in which the elapsed time $\Delta T$ is shorter than or equal to the wait time Tmax. This unfreezes the discharge valve 30. Further, the wait time Tmax is short. Thus, the compressed air drying device 12 can be immediately shifted to the normal mode.

(3) In the cold mode that drives the compressor 11 while restricting opening of the discharge valve 30, the compressor 11 stops when the pressure Phc become higher than or equal to the upper limit value Pmax. Thus, even in the cold mode, the supply of excessive air to the downstream side of the compressed air drying device 12 is prevented.

(Second Embodiment)

A compressed air drying device 12 of a second embodiment will now be described with reference to FIG. 4. The compressed air drying device 12 of this embodiment differs from the compressed air drying device 12 of the first embodiment in that an anti-freezing device such as a heater is used. The anti-freezing device is activated in accordance with the condition of the discharge valve 30. The anti-freezing device is used to prevent freezing of the discharge valve 30 and can be deactivated when the discharge valve 30 is not frozen. The description hereafter will focus on the difference from the first embodiment. In the description hereafter, the "regeneration process" refers to a process in which the flow of compressed air is reversed in the same manner as when regenerating the desiccant.

Figure 4:
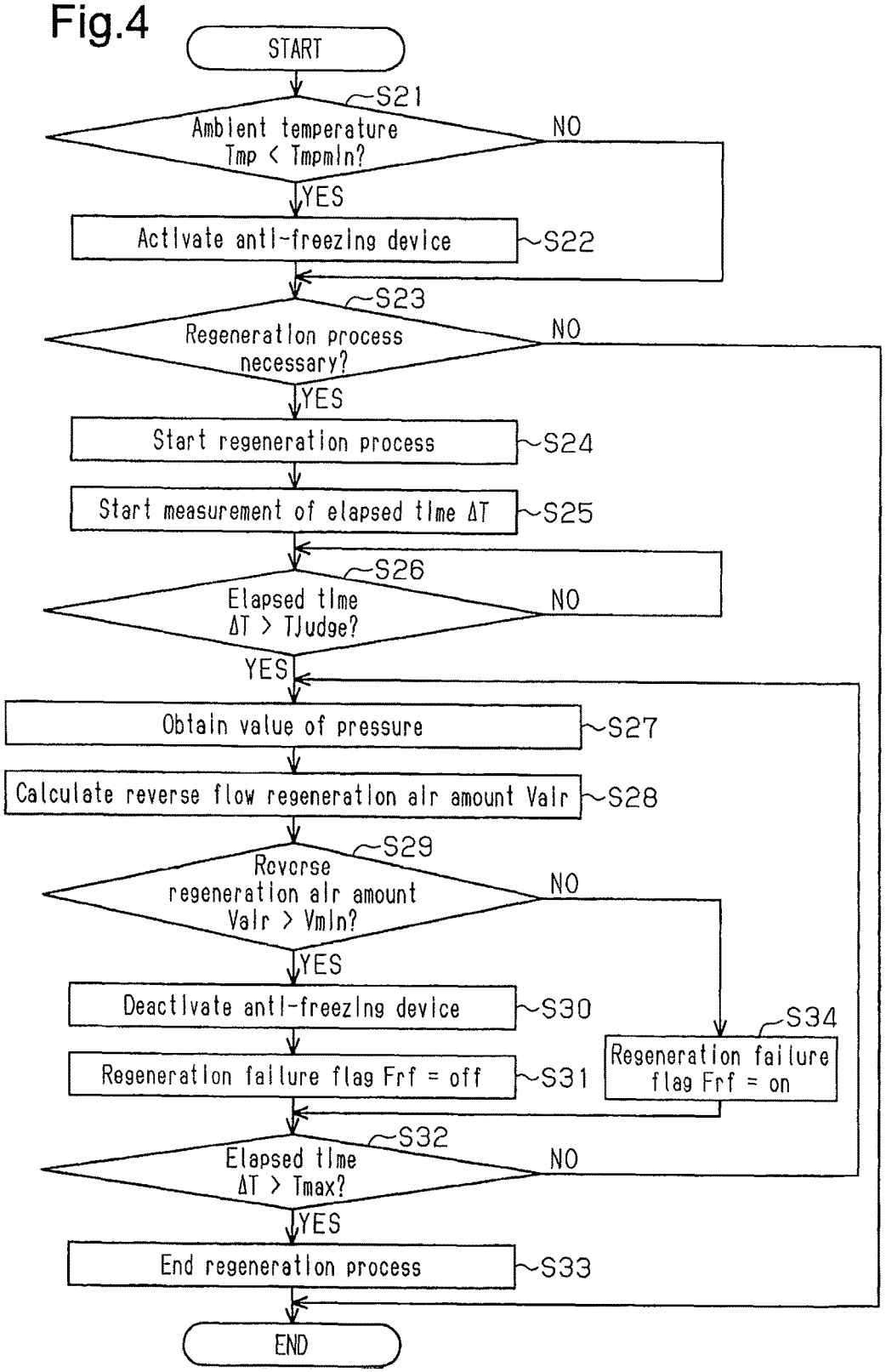
FIG. 4 is a flowchart illustrating the operation of a compressed air drying device according to a second embodiment of the present invention.

Referring to FIG. 4, the air dryer ECU 15 determines whether or not the ambient temperature Tmp is lower than a freezing determination temperature Tmpmin (step S21). More specifically, when the ambient temperature Tmp obtained through the on-board network 61 is, for example, lower than the freezing determination temperature Tmpmin of 0° C., there is a possibility that freezing of the discharge valve 30 will occur. Thus, the air dryer ECU 15 determines whether or not the discharge valve 30 is frozen.

Consequently, when determining that the ambient temperature Tmp is higher than or equal to the freezing determination temperature Tmpmin (step S21: NO), the air dryer ECU 15 proceeds to step S23.

When determining that the ambient temperature Tmp is lower than the freezing determination temperature Tmpmin (step S21: YES), the air dryer ECU 15 activates the anti-freezing device (step S22). More specifically, since the discharge valve 30 is frozen, the air dryer ECU 15 activates the anti-freezing device to unfreeze the discharge valve 30.

Then, the air dryer ECU 15 determines whether or not a regeneration process needs to be performed (step S23). More specifically, the air dryer ECU 15 determines from a regeneration condition whether or not a regeneration process is necessary. The regeneration condition is whether or not the compressed air amount that has passed through the desiccant during loading is greater than a threshold value. The dry compressed air that passes through the desiccant is supplied from the air tanks of at least some of the loads 21 to 28. The threshold value is determined taking into account the limit passage amount of the desiccant. The air dryer ECU 15 determines that there is no need to perform a regeneration process when the compressed air amount is not greater than the threshold value (step S23: NO) and ends the process.

When the compressed air amount is greater than the threshold value, the air dryer ECU 15 determines that a regeneration process needs to be performed (step S23: YES) and starts a regeneration process (step S24). Then, the air dryer ECU 15 starts measuring the elapsed time ΔT (step S25). When starting the regeneration process, the air dryer ECU 15 obtains the value of the pressure Phc from the pressure sensor 65.

Further, the air dryer ECU 15 determines whether or not the elapsed time ΔT is longer than a determination time Tjudge (step S26). More specifically, the air dryer ECU 15 determines whether or not the time has elapsed that is needed to determine that the anti-freezing device is activated to unfreeze the discharge valve. Consequently, when determining that the elapsed time ΔT is shorter than or equal to the determination time Tjudge (step S26: NO), the air dryer ECU 15 waits until the elapsed time ΔT becomes longer than the determination time Tjudge.

When the air dryer ECU 15 determines that the elapsed time ΔT is longer than the determination time Tjudge (step S26: YES), the air dryer ECU 15 obtains the value of the pressure Phc from the pressure sensor 65 (step S27). When a regeneration process starts, the consumption of the dry compressed air in the air tanks decreases the pressure value Phc. Further, a reverse flow regeneration air amount Vair is calculated from the difference between the value of pressure Phc obtained when starting the regeneration process and the value of the pressure Phc obtained in step S27 (step S28).

Then, the air dryer ECU 15 determines whether or not the reverse flow regeneration air amount Vair is greater than a determination air amount Vmin (step S29). More specifically, when the elapsed time ΔT is longer than the determination time Tjudge, it is assumed that the reverse flow regeneration air amount Vair has reached the determination air amount Vmin. Thus, the air dryer ECU 15 determines whether or not the reverse flow regeneration air amount Vair is normal. Consequently, when determining that the reverse flow regeneration air amount Vair is less than or equal to the determination air amount Vmin (step S29: NO), the air dryer ECU 15 sets a regeneration failure flag Frf to on (step S34). When the regeneration failure flag Frf is set to on, the air dryer ECU 15 shows a message Indicating the occurrence of a regeneration failure on, for example, an instrument panel of the vehicle.

When determining that the reverse flow regeneration air amount Vair is greater than the determination air amount Vmin (step S29: YES), the air dryer ECU 15 deactivates the anti-freezing device (step S30). Further, the air dryer ECU 15 sets the regeneration failure flag Frf to off (step S31).

Then, the air dryer ECU 15 determines whether or not the elapsed time ΔT is longer than the wait time Tmax (step S32). More specifically, since the air dryer ECU 15 determines whether or not the elapsed time ΔT is longer than the wait time Tmax until the elapsed time ΔT reaches the wait time Tmax, the air dryer ECU 15 determines whether or not the elapsed time ΔT is longer than the wait time Tmax. Consequently, when determining that the elapsed time ΔT is shorter than the wait time Tmax (step 32: NO), the air dryer ECU 15 proceeds to step S27. More specifically, the elapsed time ΔT has not reached the wait time Tmax. Thus, the air dryer ECU 15 proceeds in order from step S27 and determines again whether or not the reverse flow regeneration air amount Vair is greater than the determination air amount Vmin (step S29).

When determining that the elapsed time ΔT is longer than the wait time Tmax (step S32: YES), the air dryer ECU 15 ends the regeneration process (step S33).

In this manner, when calculating the reverse flow regeneration air amount Vair, if the reverse flow regeneration air amount Vair is less than or equal to the determination air amount Vmin, the air dryer ECU 15 determines that the discharge valve 30 is frozen and that a regeneration failure is occurring. This prevents continuation of the regeneration process when there is a regeneration failure.

The present embodiment has the advantages described below in addition to advantages (1) to (3) of the first embodiment.

(4) The air dryer ECU 15 calculates the reverse flow regeneration air amount Vair. Further, when the reverse flow regeneration air amount Vair is less than or equal to the determination air amount Vmin, the air dryer ECU 15 determines that the discharge valve is frozen and that a regeneration failure is occurring. This prevents the air dryer ECU 15 from continuing the regeneration process when there is a regeneration failure.

(5) The anti-freezing device is deactivated when the air dryer ECU 15 determines that the discharge valve 30 is not frozen. This reduces the power consumed by the anti-freezing device.

(Third Embodiment)

A compressed air drying device 12 of a third embodiment will now be described with reference to FIG. 5. The compressed air drying device 12 of this embodiment differs from the compressed air drying device 12 of the first embodiment in that the discharge valve 30 undergoes a failure diagnosis to determine if the discharge valve 30 should be supplied with and unfrozen by compressed air. The description hereafter will focus on the difference from the first embodiment. In the description hereafter, the "regeneration process" refers to a process in which the flow of compressed air is reversed in the same manner as when regenerating the desiccant.

The compressed air drying device 12 of the present embodiment includes an anti-freezing device such as a heater. The anti-freezing device is used to prevent freezing of the discharge valve 30 and can be deactivated when the discharge valve 30 is not frozen.

The compressed air drying device 12 of the present embodiment includes a temperature sensor that measures the temperature in the compressed air drying device 12. The temperature sensor outputs the measured temperature to the air dryer ECU 15.

Figure 5:
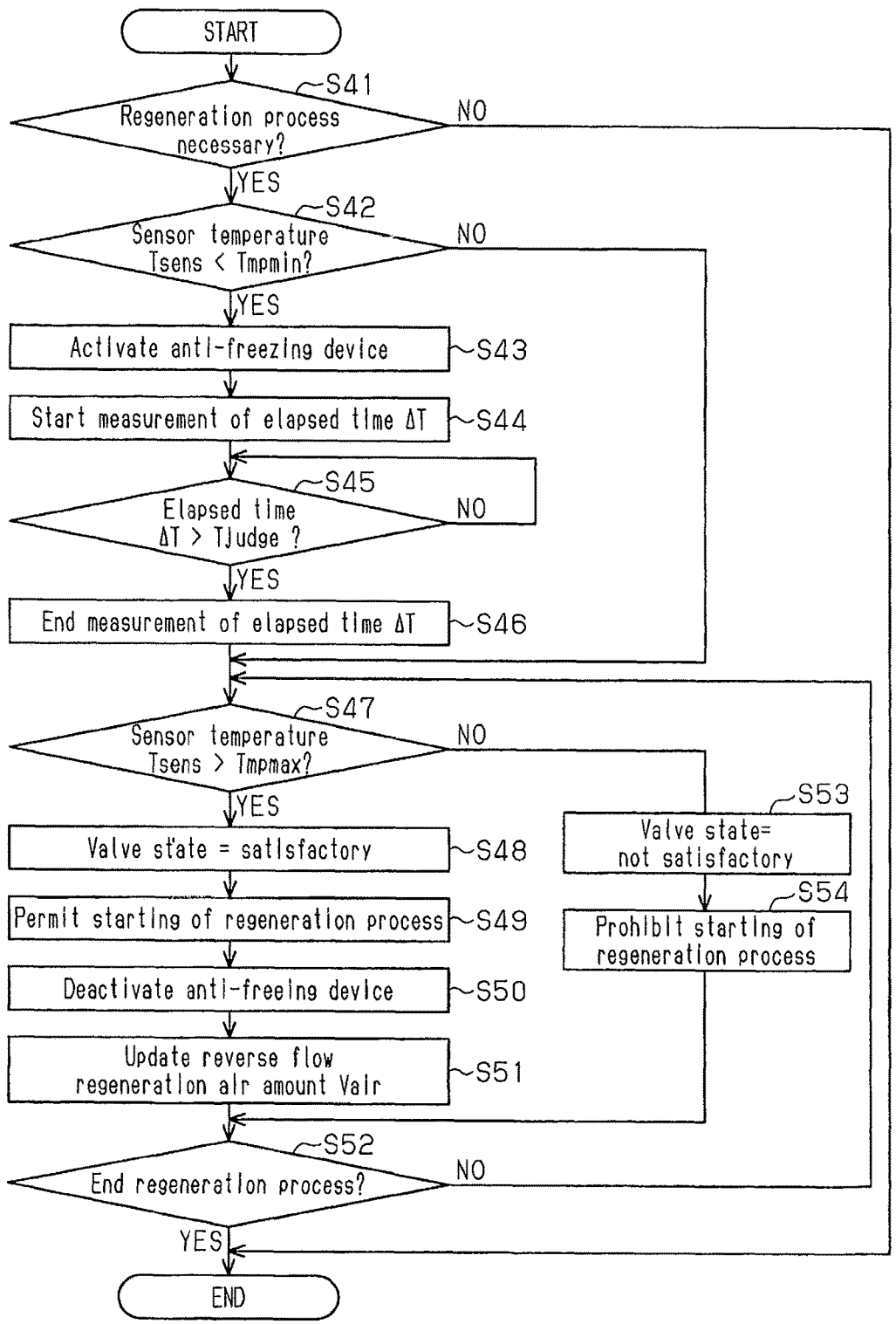
FIG. 5 is a flowchart illustrating the operation of a compressed air drying device according to a third embodiment of the present invention.

As shown in FIG. 5, the air dryer ECU 15 determines whether or not a regeneration process needs to be performed (step S41). More specifically, the air dryer ECU 15 determines from a regeneration condition whether or not a regeneration process is necessary. The regeneration condition is whether or not the compressed air amount that has passed through the desiccant during loading is greater than a threshold value. The threshold value is determined taking into account the limit passage amount of the desiccant. The air dryer ECU 15 determines that there is no need to perform a regeneration process when the compressed air amount is not greater than the threshold value (step S41: NO) and ends the process.

When the compressed air amount is greater than the threshold value, the air dryer ECU 15 determines that a regeneration process needs to be performed (step S41: YES) and then determines whether or not a sensor temperature Tsens obtained from the temperature sensor, that is, the temperature in the compressed air drying device 12, is lower than the freezing determination temperature Tmpmin (step S42). More specifically, when the sensor temperature Tsens is lower than the freezing determination temperature Tmpmin of 0° C., there is a possibility that freezing of the discharge valve 30 will occur. Thus, the air dryer ECU 15 determines whether or not the discharge valve 30 is frozen. Consequently, when determining that the sensor temperature Tsens is higher than or equal to the freezing determination temperature Tmpmin (step S42: NO), the air dryer ECU 15 proceeds to step S47.

When the sensor temperature Tsens is lower than the freezing determination temperature Tmpmin (step S42: YES), the air dryer ECU 15 activates the anti-freezing device (step S43). More specifically, since the discharge valve 30 is frozen, the air dryer ECU 15 activates the anti-freezing device to unfreeze the discharge valve 30.

Then, the air dryer ECU 15 starts measuring the elapsed time ΔT (step S44). Further, the air dryer ECU 15 determines whether or not the elapsed time ΔT is longer than the determination time Tjudge (step S45). More specifically, the air dryer ECU 15 determines whether or not the time has elapsed that is needed to determine that the anti-freezing device is activated to unfreeze the discharge valve. Consequently, when determining that the elapsed time ΔT is shorter than or equal to the determination time Tjudge (step S45: NO), the air dryer ECU 15 waits until the elapsed time ΔT becomes longer than the determination time Tjudge.

When the air dryer ECU 15 determines that the elapsed time ΔT is longer than the determination time Tjudge (step S45: YES), the air dryer ECU 15 ends the measurement of the elapsed time ΔT (step S46).

Then, the air dryer ECU 15 determines whether or not the sensor temperature Tsens is higher than an unfreezing determination temperature Tmpmax (step S47). More specifically, since the elapsed time ΔT has become longer than the determination time Tjudge, it is assumed that the discharge valve 30 is unfrozen. Thus, the air dryer ECU 15 determines whether or not the discharge valve 30 is in a normal state. Consequently, when determining that the sensor temperature Tsens is lower than or equal to the unfreezing determination temperature Tmpmax (step S47: NO), the air dryer ECU 15 determines that there is a failure in the discharge valve 30 (step S53). Then, the air dryer ECU 15 prohibits the starting of a regeneration process (step S54) and proceeds to step S52.

When determining that the sensor temperature Tsens is higher than the unfreezing determination temperature Tmpmax (step S47: YES), the air dryer ECU 15 determines that the discharge valve 30 is in a satisfactory state (step S48). Then, the air dryer ECU 15 permits the starting of a regeneration process (step S49) and deactivates the anti-freezing device (step S50). More specifically, since the discharge valve 30 is unfrozen, the air dryer ECU 15 deactivates the anti-freezing device. In this case, the regeneration process is started by the air dryer ECU 15.

Subsequently, the air dryer ECU 15 updates the reverse flow regeneration air amount Vair (step S51). More specifically, when the regeneration process starts, the air dryer ECU 15 calculates and updates the reverse flow regeneration air amount Vair.

Then, the air dryer ECU 15 determines whether or not to end the regeneration process (step S52). More specifically, the air dryer ECU 15 determines from an ending condition whether or not to end the regeneration process. The end condition is whether or not the reverse flow regeneration air amount Vair is greater than a predetermined threshold value. When the reverse flow regeneration air amount Vair is not greater than the predetermined threshold value, the air dryer ECU 15 determines not to end the regeneration process (step S52: NO) and proceeds to step S47.

When the reverse flow regeneration air amount Vair is greater than the predetermined threshold value, the air dryer ECU 15 determines to end the regeneration process (step S52: YES) and ends the process.

In this manner, the sensor temperature Tsens, which is the temperature in the compressed air drying device 12, is measured. When the sensor temperature Tsens is lower than or equal to the unfreezing determination temperature Tmpmax, the discharge valve 30 is determined as being frozen and the starting of a regeneration process is thus prohibited. This reduces regeneration failures. Additionally, in comparison with when periodically measuring the temperature to make determinations, the frequency and time during which the temperature sensor and the air dryer ECU 15 are activated can be reduced.

The present embodiment has the advantage described below in addition to advantages (1) to (3) of the first embodiment and advantage (5) of the second embodiment.

(6) The sensor temperature Tsens, which is the temperature in the compressed air drying device 12, is measured. When the sensor temperature Tsens is lower than or equal to the unfreezing determination temperature Tmpmax, the discharge valve 30 is determined as being frozen and the starting of a regeneration process is thus prohibited. This reduces regeneration failures.

(Other Embodiments)

The embodiments described above may be modified as described below.

In the configurations described above, the vehicle loads to which dry compressed air is supplied from the compressed air drying device 12 may be some of the loads 21 to 28 or loads other than the loads 21 to 28.

In the configurations described above, the pneumatic pressure circuit including the protection valves, the pressure reducing valves, and the check valves between the ports P21 to P28 may be changed in accordance with the configuration or the like of each load. For example, the configuration of the pneumatic pressure circuit may include some of the protection valves and the pressure reducing valves.

In the embodiments described above, the drying container 18 includes an oil mist capturing portion in addition to the desiccant but only needs to purify the compressed air supplied from the compressor 11. For example, the oil mist capturing portion may be omitted and a separate filter may be used to remove, for example, dust.

In the embodiments described above, during the period in which the cold mode is set, the upper limit value Pmax for deactivating the compressor 11 is the same as the upper limit value for starting the unloading operation. However, these values may differ from each other.

In the embodiments described above, an operation for starting the engine is performed when the ambient temperature Tmp is less than 0° C. However, the temperature that is set as the threshold only needs to be in the vicinity of 0° C. at which there is a possibility of water freezing on the discharge valve 30.

In the embodiments described above, the discharge valve 30 is arranged in the dryer 80. However, as long as the heat of the compressed air from the compressor 11 can be absorbed, other configurations can be employed. For example, the discharge valve 30 may be arranged in a housing that accommodates the drying container 18 and absorb the heat of the dry compressed air that passes through the drying container 18. Alternatively, the discharge valve 30 may be arranged separately from the flow passage supplying the drying container 18 with compressed air from the compressor 11 and absorb the heat transmitted through the flow passage.

In the embodiments described above, the first electromagnetic valve 16, the second electromagnetic valve 17, the drying container 18, and the discharge valve 30 are accommodated in the dryer 80. However, each of these elements may be arranged separately from each other. For example, the drying container 18 and the discharge valve 30 may be arranged in the dryer 80 so that the first electromagnetic valve 16 and the second electromagnetic valve 17 are separate from the dryer 80.

In the embodiments described above, the compressor 11 is driven by the power of the engine 14 but may be driven by another power source such as a motor.

In the embodiments described above, activation of the first electromagnetic valve 16 is prohibited to restrict opening of the discharge valve 30. However, the pressure Phc of the drying container 18 may be kept less than the upper limit value at which the unloading operation is started to restrict opening of the discharge valve 30.

In the embodiments described above, the air dryer ECU 15 is arranged in the compressed air drying device 12 but may be arranged separately from the compressed air drying device 12.

The compressed air supply system described above is embodied in a system installed in a vehicle. However, the compressed air supply system may be a system installed in a different mobile body including an engine such as a ship and aircraft.

In the embodiments described above, when the elapsed time ΔT from when the engine 14 is started reaches the wait time Tmax, opening of the discharge valve 30 is permitted. Instead of the elapsed time ΔT, opening of the discharge valve 30 may be permitted based on the temperature in the vicinity of the check valve. In this case, a temperature sensor is arranged in the vicinity of the check valve. When the temperature measured by the temperature sensor reaches a predetermined temperature, opening of the discharge valve 30 is permitted and the normal mode is performed.

In the embodiments described above, the compressor 11 is set to the unloading state when the pressure Phc measured by the pressure sensor 65 becomes higher than or equal to the upper limit value Pmax. Instead, an electromagnetic valve may be arranged at the downstream side of the drying container 18. When the pressure Phc becomes greater than or equal to the upper limit value Pmax, the electromagnetic valve opens and forcibly releases the dry compressed air at the downstream side of the drying container 18 into the atmosphere. This decreases the pressure Phc to lower than the upper limit value Pmax and keeps the compressor 11 in the loading state.

In the embodiments described above, at least either one of the inlet of the dryer and the compressed air supply passage 71 may be located near the discharge valve 30. This allows the discharge valve 30 to be heated with heated compressed air without using an anti-freezing device such as a heater.

In the embodiments described above, the discharge valve 30 may be located near at least either one of the inlet of the dryer and the compressed air supply passage 71. This allows the discharge valve 30 to be heated with heated compressed air without using an anti-freezing device such as a heater.

In the embodiments described above, the freezing of the discharge valve 30 is determined based on the measurement of the temperature sensor. However, the freezing of the discharge valve 30 may be determined based on information of at least one of the vehicle travel distance, the vehicle travel time, and the vehicle speed.

In the configuration described above, the temperature of the compressed air near the discharge valve 30 may be measured to permit opening of the discharge valve 30 when the temperature is higher than the freezing determination temperature Tmpmin and to prohibit opening of the discharge valve 30 when the temperature is lower than or equal to the freezing temperature Tmpmin.

The present invention is not limited to the examples described above. For example, it should be understood that the features of specific embodiments that have been disclosed are all not essential to the present invention. The subject matter of the present invention may exist in features that are less than all of the features of specific embodiments that have been disclosed.

DESCRIPTION OF REFERENCE CHARACTERS

11: compressor, 12: compressed air drying device, 14: engine, 15: ECU serving as controller, 16: first electromagnetic valve, 17: second electromagnetic valve, 18: drying container, 19: check valve, 21 to 28: first to eighth loads, 30: discharge valve, 31: discharge port, 50 to 52 and 58 to 60: protection valves, 53 to 54: check valves, 55 to 56: throttles, 57 and 64: pressure reducing valves, 61: on-board network, 62: engine ECU, 63: ambient temperature sensor, 65 to 70: pressure sensors, P21 to P28: first to eighth ports.

The invention claimed is:

1. A compressed air drying device that dries compressed air discharged from a compressor, the compressed air drying device comprising:
a dryer including a drying container and a discharge valve, wherein the drying container is filled with a desiccant, the discharge valve is arranged in a discharge port that discharges drainage produced by regeneration of the desiccant, and the compressed air, which is compressed and heated by the compressor, moves into the dryer; and
a controller that obtains an ambient temperature and controls opening and closing of the discharge valve,
wherein when the ambient temperature is a temperature at which freezing occurs, the controller moves the compressed air, which is discharged from the compressor and heated, into the dryer and restricts opening of the discharge valve.

2. The compressed air drying device according to claim 1, wherein the controller measures an elapsed time from when operation of the compressor starts, and the controller permits opening of the discharge valve when the elapsed time exceeds a wait time that is set in advance.

3. The compressed air drying device according to claim 1, comprising a pressure sensor that detects a downstream pressure, which is the pressure at a downstream side of the desiccant,
wherein the controller stops operation of the compressor when the downstream pressure is higher than or equal to an upper limit value while restricting opening of the discharge valve.

4. The compressed air drying device according to claim 1, comprising an anti-freezing device that prevents freezing of the discharge valve,
wherein the controller deactivates the anti-freezing device when determining that the discharge valve is not frozen.

5. A method for controlling a compressed air drying device, wherein the compressed air drying device includes a dryer and a controller, the dryer includes a drying container and a discharge valve, the drying container is filled with a desiccant that dries compressed air discharged from the compressor and heated, the discharge valve is arranged in a discharge port that discharges drainage produced by regeneration of the desiccant, and the controller obtains an ambient temperature and controls opening and closing of the discharge valve, the method comprising:
moving the compressed air, which is discharged from the compressor and heated, into the dryer and restricting opening of the discharge valve with the controller when the ambient temperature is a temperature at which freezing occurs.

6. A vehicle comprising:
a compressed air drying device that dries compressed air discharged from a compressor, wherein
the compressed air drying device includes a dryer and a controller, the dryer includes a drying container and a discharge valve, the drying container is filled with a desiccant, the discharge valve is arranged in a discharge port that discharges drainage produced by regeneration of the desiccant, the compressed air, which is compressed and heated by the compressor, moves into the dryer, and the controller obtains an ambient temperature and controls opening and closing of the discharge valve,
wherein when the ambient temperature is a temperature at which freezing occurs, the controller moves the compressed air, which is discharged from the compressor and heated, into the dryer and restricts opening of the discharge valve.

7. A compressed air drying device that dries compressed air discharged from a compressor with a desiccant, the compressed air drying device comprising:
a discharge valve that discharges drainage produced by regeneration of the desiccant; and
a controller that controls opening and closing of the discharge valve,
wherein when an ambient temperature is lower than or equal to a predetermined temperature, the controller restricts opening of the discharge valve and supplies the compressed air discharged from the compressor to around the discharge valve.

8. A vehicle comprising the compressed air drying device according to claim 7.

9. A method for drying compressed air discharged from a compressor with a compressed air drying device that includes a desiccant, wherein the compressed air drying device includes a discharge valve that discharges drainage produced by regeneration of the desiccant, the method comprising:
when an ambient temperature is lower than or equal to a predetermined temperature, restricting opening of the discharge valve and supplying the compressed air discharged from the compressor to around the discharge valve.

10. The compressed air drying device according to claim 1, wherein when the ambient temperature is a temperature at which freezing occurs, the controller moving the heated, compressed air into the dryer and restricting the opening of the discharge valve causes heating of the discharge valve for unfreezing without using a separate heater.

* * * * *